United States Patent
Leccia

(10) Patent No.: US 8,907,237 B2
(45) Date of Patent: Dec. 9, 2014

(54) FLOATING CONTACT ASSEMBLY FOR SWITCHGEAR

(71) Applicant: Eaton Corporation, Cleveland, OH (US)

(72) Inventor: Brad Robert Leccia, Bethel Park, PA (US)

(73) Assignee: Eaton Corporation, Cleveland, OH (US)

( * ) Notice: Subject to any disclaimer, the term of this patent is extended or adjusted under 35 U.S.C. 154(b) by 165 days.

(21) Appl. No.: 13/675,180

(22) Filed: Nov. 13, 2012

(65) Prior Publication Data

US 2014/0131182 A1    May 15, 2014

(51) Int. Cl.
  *H01H 1/44*    (2006.01)
  *H02B 11/02*   (2006.01)
  *H01H 9/00*    (2006.01)

(52) U.S. Cl.
  CPC . *H02B 11/02* (2013.01); *H01H 9/00* (2013.01)
  USPC ......................................... 200/257

(58) Field of Classification Search
  USPC ................. 200/238, 257; 335/11, 12; 337/15; 361/8, 605, 608
  See application file for complete search history.

(56) References Cited

U.S. PATENT DOCUMENTS

| | | | |
|---|---|---|---|
| 3,899,722 A * | 8/1975 | Cadez et al. | 361/606 |
| 7,479,612 B2 * | 1/2009 | Waldi et al. | 200/507 |
| 7,927,155 B2 * | 4/2011 | Mittu et al. | 439/700 |
| 8,248,760 B2 | 8/2012 | Abrahamsen et al. | |
| 2008/0087531 A1 * | 4/2008 | Rakus et al. | 200/244 |
| 2012/0006661 A1 | 1/2012 | Abrahamsen et al. | |
| 2012/0127636 A1 | 5/2012 | Abrahamsen et al. | |

* cited by examiner

*Primary Examiner* — Vanessa Girardi
(74) *Attorney, Agent, or Firm* — Eckert Seamans Cherin & Mellott, LLC; David C. Jenkins

(57) ABSTRACT

A floating contact assembly is provided. The floating contact assembly includes a substantially rigid first conductive member, a flexible conductive shunt, and a substantially rigid second conductive member. The flexible conductive shunt is coupled to, and is in electrical communication with, the first conductive member. The second conductive member is coupled to, and is in electrical communication with, the flexible conductive shunt. In this configuration, the second conductive member "floats" within the first conductive member.

9 Claims, 4 Drawing Sheets

FLOATING CONTACT ASSEMBLY FOR SWITCHGEAR

BACKGROUND OF THE INVENTION

1. Field of the Invention

The disclosed concept relates to a switch arrangement for an electrical switchgear.

2. Background Information

As is well known, a switchgear is an integrated assembly of switches, circuit breakers, buses (i.e., power supply rails), fuses and other components used to isolate electrical equipment at an electrical installation, for example, an electrical power substation. A switchgear is used to both de-energize equipment to allow work to be done and to clear faults downstream of the switchgear. The switchgear is often housed in a metal housing assembly at the installation. A circuit breaker assembly includes a base and one or more elongated switching elements, such as, but not limited to, vacuum interrupters. The switching element includes an internal set of separable contacts. That is, the switching element may be open or closed as is known. Further, the switching element includes two external contacts, one at the proximal end and one at the distal end. The circuit breaker assembly is structured to move between various positions relative to the housing assembly including a first withdrawn position and a second fully inserted position. The circuit breaker assembly may also be placed in various intermediate positions, as discussed below. The switching elements extend from the circuit breaker assembly base in a cantilever manner with the longitudinal axis extending generally horizontally. Accordingly, as used herein, the end of the switching element adjacent, or directly coupled to, the circuit breaker assembly base is the proximal end and the end of the switching element spaced from the circuit breaker assembly base is the distal end. This convention will be used with other elements of the switchgear as described below.

In one embodiment of a switchgear, the housing assembly includes a conductor assembly including a number of conductive buses, a contact insulator, and a number of contacts. The contact insulator is, in an exemplary embodiment, an elongated hollow, non-conductive body or segmented body assembly. The longitudinal axis of each contact insulator is generally aligned with longitudinal axis of a movable switching element. Thus, as the circuit breaker assembly moves between the positions noted above, the switching element is moving longitudinally in and out of, and through, the contact insulator. Accordingly, the contact insulator includes a proximal end that is closer to the circuit breaker assembly base and a distal end that is spaced from the circuit breaker assembly base. Further, the contact insulator includes a medial portion.

Within the contact insulator hollow body there are three contact assemblies. The contact insulator contact assemblies are spaced apart substantially the same distance as the switching element contacts. The contact insulator contact assemblies are disposed as follows: one contact assembly at the proximal end, one contact assembly in the medial portion, and one contact assembly at the distal end. The various contact assemblies are coupled to, and in electrical communication with, the conductive buses. The conductive buses are further coupled to, and in electrical communication with, a line, a load, or a ground. For example, the distal contact assembly is typically coupled via a conductive bus to, and is in electrical communication with, a line. The medial contact assembly is typically coupled via a conductive bus to, and is in electrical communication with, a load. The proximal contact assembly may be coupled via a conductive bus to, and be in electrical communication with, a secondary line or a ground. As used herein as an example, the proximal contact is coupled via a conductive bus to a ground.

As the circuit breaker assembly moves between the first and second positions, the switching element external contacts engage, and are in electrical communication with, different contact assemblies. For example, when the circuit breaker assembly is in the first, fully withdrawn position, the switching element is spaced from the contact insulator and the switching element external contacts do not contact any of the contact insulator contact assemblies. As the circuit breaker assembly moves toward the second position, the switching element enters the contact insulator and the switching element distal contact engages, i.e. becomes coupled to and is in electrical communication with, the contact insulator proximal contact assembly. In this configuration, the switching element is grounded. As the circuit breaker assembly continues to move toward the second position, the switching element distal contact disengages from the contact insulator proximal contact assembly and moves toward the contact insulator medial contact assembly. The switching element distal contact then engages, i.e. becomes coupled to and in electrical communication with, the contact insulator medial contact assembly. Simultaneously, the switching element proximal contact engages, i.e. becomes coupled to and in electrical communication with, the contact insulator proximal contact assembly. In this configuration, and when the switching element internal contacts are closed, the load is grounded. When the circuit breaker assembly continues to move toward the second position, the switching element contacts disengage from the identified contact assemblies. As the circuit breaker assembly moves into the second position, the switching element distal contact engages, i.e. becomes coupled to and in electrical communication with, the contact insulator distal contact assembly. Simultaneously, the switching element proximal contact engages, i.e. becomes coupled to and in electrical communication with, the contact insulator medial contact assembly. In this configuration, and when the switching element internal contacts are closed, the load is coupled to, and in electrical communication with, the line.

Thus, a contact assembly may be in one of two configurations: a first configuration, wherein the contact assembly is not coupled to and in electrical communication with a switching element external contact, and a second configuration, wherein the contact assembly is coupled to and in electrical communication with a switching element external contact.

The switching elements and the contact insulators typically have a generally circular cross-section. Thus, the switching element contacts and the contact insulator contact assemblies are typically circular as well. The contact insulator contact assemblies are slightly larger than the switching element contacts so as to allow the switching element contacts to move through the contact insulator contact assemblies. The contact insulator contact assemblies cannot, however, be too much larger than the switching element contacts as the contacts must actually contact each other when coupled. This is a disadvantage when the switching element is not substantially aligned with the contact insulator, i.e. when the longitudinal axis of the switching element is not substantially aligned with the longitudinal axis of the contact insulator. When a misalignment occurs, the switching element contacts may not pass through, or into, the contact insulator contact assemblies. Rather, the switching element contacts may engage, catch, or bind, upon the axial face of the contact insulator contacts.

There is, therefore, a need for a contact assembly structured to allow a switching element to pass through a contact insulator contact even when the longitudinal axis of the switching element is not substantially aligned with the longitudinal axis of the contact insulator.

SUMMARY OF THE INVENTION

According to the disclosed concept, a floating contact assembly is provided. The floating contact assembly includes a substantially rigid first conductive member, a flexible conductive shunt, and a substantially rigid second conductive member. The flexible conductive shunt is coupled to, and is in electrical communication with, the first conductive member. The second conductive member is coupled to, and is in electrical communication with, the flexible conductive shunt. In this configuration, the second conductive member "floats" within the first conductive member. That is, as used herein, "float" means to be movably disposed within a limited range relative to another element. The floating contact assembly may be disposed on either the switching element or the contact insulator. In an exemplary embodiment, the contact on the switching element is a coil that is wrapped about the switching element. Such a coil is slightly compressible. In this embodiment, the floating contact assembly is disposed on the contact insulator.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, directional terms, such as, but not limited to, "forward," "back," "right," "left," "upper," "lower," and "lateral" correspond to the orientation of the utility cart from the perspective of a user standing at the handle portion looking toward the tray—that is, the normal position a user would occupy to move the utility cart. Such directional terms are not limiting upon the claims.

As used herein, the singular form of "a," "an," and "the" include plural references unless the context clearly dictates otherwise. Further, as used herein, the phrase "a number" or variations thereof means one or an integer greater than one.

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

As used herein, "correspond" indicates that two structural components are sized and shaped to contact or engage each other with a minimum amount of friction or to generally fit together. For example, an opening which "corresponds" to a member is sized slightly larger than the member so that the member may pass through the opening with a minimum amount of friction.

As used herein, "at" means on or near.

As used herein, "semi-rigid" means that an element may be flexed when a bias is applied thereto, but will return to its original shape when the bias is removed.

As used herein, "unitary" means a component is created as a single piece or unit. That is, a component that includes pieces that are created separately and then coupled together as a unit is not a "unitary" component or body.

Figure 1:
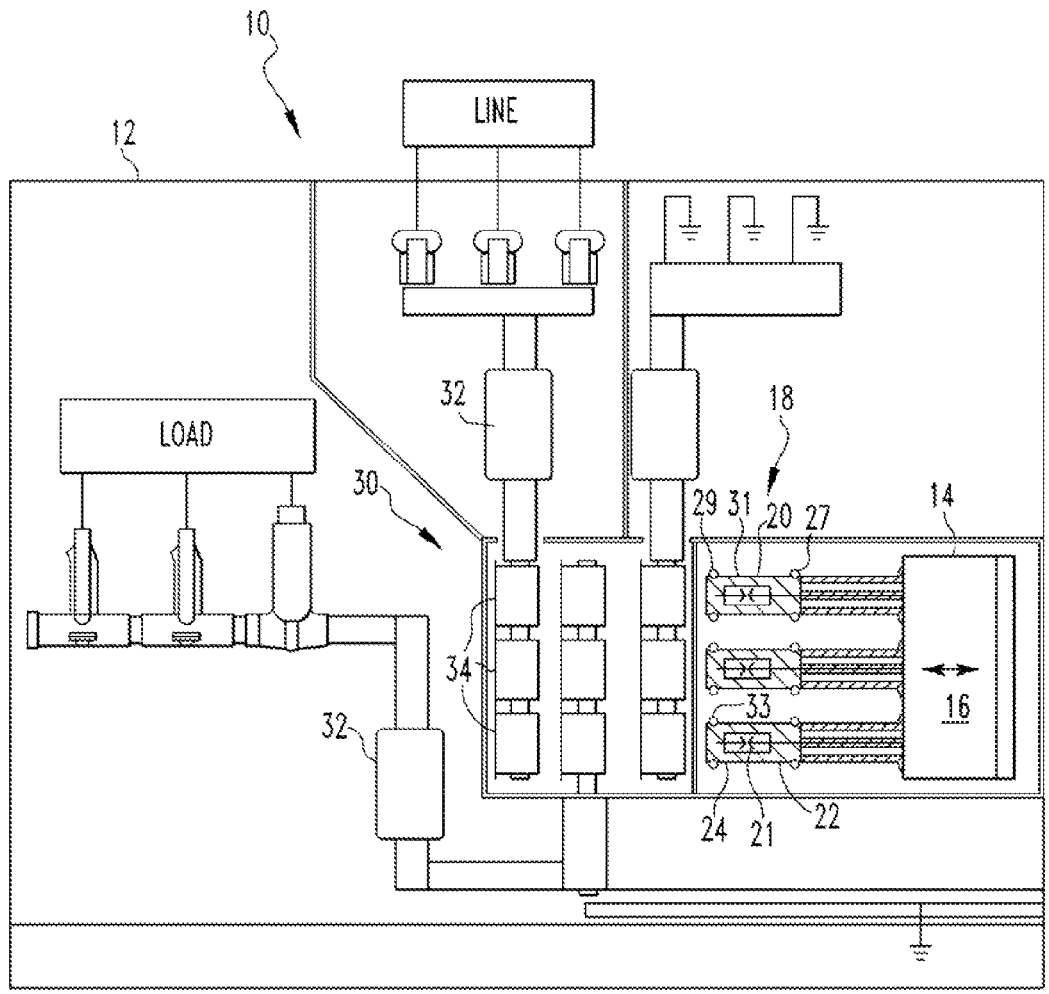
FIG. 1 is a schematic side view of a switchgear.

As shown schematically in FIG. 1, a switchgear 10 includes a housing assembly 12 and a circuit breaker assembly 14. The circuit breaker assembly 14 includes a base 16 and a number of switching elements 18. The switching elements 18 may be, but are not limited to, vacuum circuit breakers 20. Switching elements 18, such as vacuum circuit breakers 20, include internal contacts 21 that may be disposed in an open, first position, or a closed, second position. In one embodiment, the circuit breaker assembly 14 includes three switching elements 18. The number of switching elements 18, however, is not relevant to the invention disclosed below so the following description will describe a single switching element 18. It is understood, however, that additional switching elements 18 may be part of the circuit breaker assembly 14.

The switching element 18 is elongated and, in an exemplary embodiment, the longitudinal axis extends generally horizontally from the circuit breaker assembly base 16. The switching element 18 extends in a cantilever manner from the circuit breaker assembly base 16. As such, the switching element 18 includes a proximal, first end 22, disposed adjacent the circuit breaker assembly base 16, and, a distal second end 24, disposed away from the circuit breaker assembly base 16. This convention will be used with other elements of the switchgear 10 as described below. That is, elements that are generally closer to the circuit breaker assembly base 16 will be described as "proximal" and those elements spaced from the circuit breaker assembly base 16 will be described as "distal."

A first non-floating contact 27 is disposed at the switching element first end 22 and a second non-floating contact 29 is disposed at the switching element second end 24. As discussed below, a generic non-floating contact 90 may also be disposed upon a conductor assembly 30 while a floating contact assembly 36, also discussed below, may be disposed on switching element 18. That is, the location of the floating contact assembly 36 and the non-floating contact 90 may be reversed. Each switching element contact 27, 29 is in electrical communication with one of the internal contacts 21. Thus, when the internal contacts 21 are in the closed, second position, electricity may pass through the switching element 18 via the first and second switching element contacts 27, 29. In an exemplary embodiment, the switching element 18 has a body 31 with a generally circular cross-section. In an exemplary embodiment, the first and second switching element contacts 27, 29 extend about the outer surface of the switching element body 31. The first and second switching element contacts 27, 29 include a conductive body 23. When the switching element 18 has a generally circular cross-section, the first and second switching element contacts 27, 29 are generally toroidal and extend about the switching element 18. In one exemplary embodiment, the switching element first and second contacts 27, 29 are spring-like coils 33 that are wrapped about the switching element body 31. That is, the switching element body 31 may include a first end groove 35 and a second end groove 37. The first and second switching element contacts 27, 29 are sized, i.e. have a diameter, to correspond to the width of the switching element body first and second grooves 35, 37. The switching element body first and second grooves 35, 37 have a depth that is less than the diameter of the first and second switching element contacts 27, 29. In this configuration, a portion of the first and second switching element contacts 27, 29 extends above the switching element body first and second grooves 35, 37. Further, the first and second switching element contacts 27, 29 are compressible due to the nature of a coiled body 31.

Figure 2A:
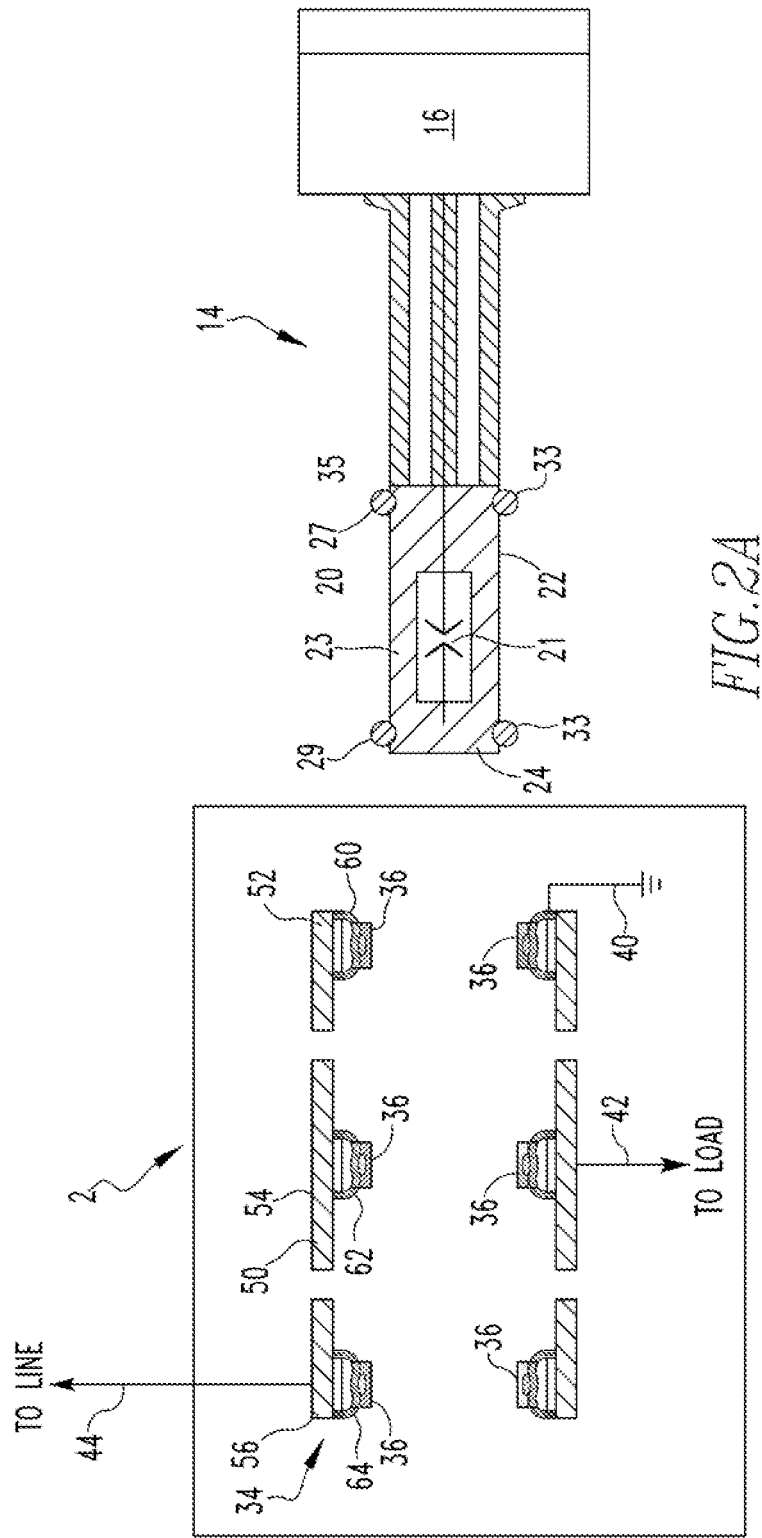
FIG. 2A is a schematic side view of switching element in a first position.
Figure 2B:
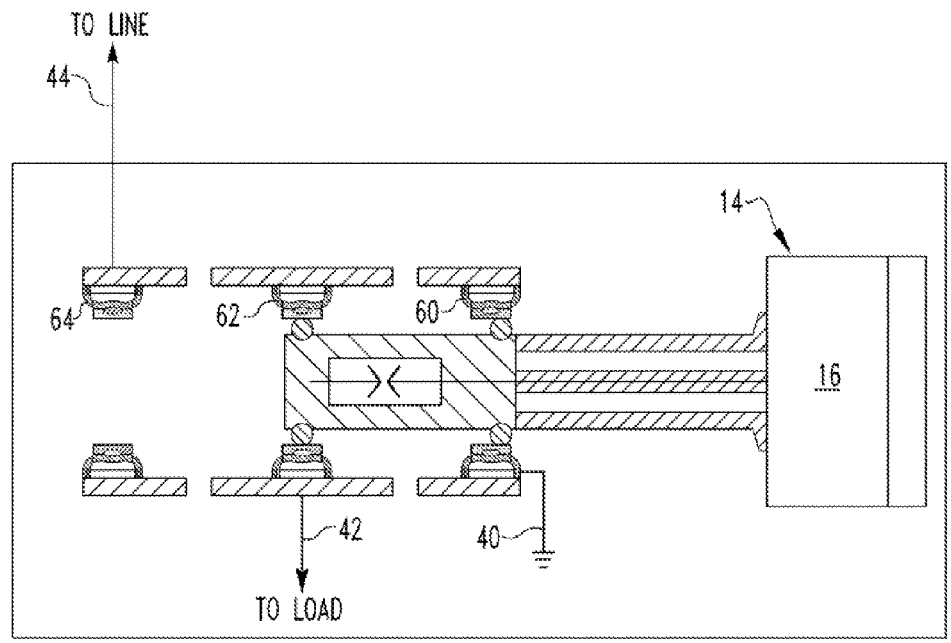
FIG. 2B is a schematic side view of switching element in an intermediate position.
Figure 2C:
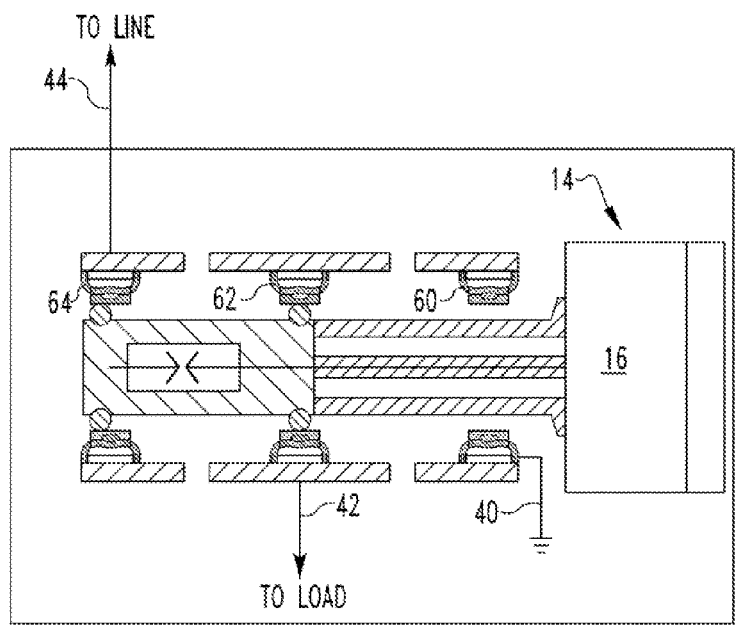
FIG. 2C is a schematic side view of switching element in a second position.

The circuit breaker assembly 14 is structured to move generally linearly between two positions, with a number of intermediate positions, as shown in FIGS. 2A-2C. These positions will be described in greater detail below, but generally, in a fully withdrawn first position, the circuit breaker assembly 14 is withdrawn from the housing assembly 12 and in a fully inserted second position, the circuit breaker assembly 14 is disposed fully within the housing assembly 12. As the circuit breaker assembly 14 moves between the two positions, and the intermediate positions, the switching element 18 also moves between a first and second position, and intermediate positions, as described below.

The housing assembly 12 includes a conductor assembly 30. The conductor assembly 30 includes a number of conductive buses 32, contact insulators 34, and contact assemblies 36. Again, it is noted that the present description relates to a single switching element 18; it is understood that each switching element 18 will have associated elements of the conductor assembly 30. That is, the following description will describe the elements of the conductor assembly 30 associated with a single switching element 18. In an embodiment with multiple switching elements 18, each switching element 18 will have similar elements of the conductor assembly 30 associated therewith.

In an exemplary embodiment, the number of conductive buses 32 includes a first bus 40, a second bus 42, and a third bus 44. Each bus 40, 42, 44 is coupled to, and in electrical communication with one of a ground, load, and line (not shown). In the exemplary embodiment shown, the first bus 40 is coupled to, and in electrical communication with a ground, the second bus 42 is coupled to, and in electrical communication with a load, and the third bus 44 is coupled to, and in electrical communication with a line. It is understood that this is an exemplary embodiment and other embodiments may exist. For example, instead of a first bus 40 coupled to a ground. The first bus 40, may be coupled to a secondary line (not shown). Each bus 40, 42, 44 is further coupled to, and in electrical communication with, a contact assembly 36 as described below. It is noted that there may be additional conductive buses 32 in the conductor assembly 30.

There is one contact insulator 34 associated with each switching element 18. Each contact insulator 34 is an elongated hollow body 50 sized to be disposed about a switching element 18. That is, each contact insulator 34 has a cross-sectional area that corresponds to the shape of the switching element 18. Thus, in an exemplary embodiment including switching element 18 having a generally circular cross-section, the contact insulator 34 also has a generally circular cross-section with an interior diameter that is slightly larger than the switching element 18. The contact insulator body 50 may be a single body, or, may be a segmented body as shown. The contact insulator 34 is disposed in a generally horizontal orientation. That is, the longitudinal axis of the contact insulator 34 is generally horizontal. The contact insulator 34 is disposed within the housing assembly 12 with the contact insulator 34 longitudinal axis being generally aligned with the switching element 18 longitudinal axis. The contact insulator 34 is disposed within the housing assembly 12 so that, when the circuit breaker assembly 14 is in the withdrawn, first position, the switching element 18 is spaced from the contact insulator 34, and, when the circuit breaker assembly 14 is in the inserted, second position, the switching element 18 is substantially disposed within the contact insulator 34. The intermediate positions of the switching element 18 are discussed below.

The contact insulator 34 has a proximal end 52, a medial portion 54, and a distal end 56. The contact insulator proximal end 52 is disposed adjacent the circuit breaker assembly base 16. The contact insulator medial portion 54 is disposed between the contact insulator proximal end 52 and the contact insulator distal end 56. The contact insulator distal end 56 is spaced from the circuit breaker assembly base 16.

As noted above, there is one floating contact assembly 36 coupled to, and in electrical communication with, each bus 40, 42, 44. Thus, in this exemplary embodiment, there are three floating contact assemblies 36. A first floating contact assembly 60, is disposed at the contact insulator proximal end 52, a second floating contact assembly 62 is disposed at the contact insulator medial portion 54, and a third floating contact assembly 64 is disposed at the contact insulator distal end 56. The floating contact assemblies 60, 62, 64 are spaced apart by substantially the same length that the first and second switching element contacts 27, 29 are spaced. That is, the first floating contact assembly 60 is spaced from the second floating contact assembly 62 by substantially the same length that the first and second switching element contacts 27, 29 are spaced, and, the second floating contact assembly 62 is spaced from the third floating contact assembly 64 by substantially the same length that the first and second switching element contacts 27, 29 are spaced.

The first floating contact assembly 60 is coupled to, and in electrical communication with, the first bus 40. Thus, in the exemplary embodiment, the first floating contact assembly 60 is coupled to, and in electrical communication with, a ground. The second floating contact assembly 62 is coupled to, and in electrical communication with, the second bus 42. Thus, in the exemplary embodiment, the second floating contact assembly 62 is coupled to, and in electrical communication with, a load. The third floating contact assembly 64 is coupled to, and in electrical communication with, the third bus 44. Thus, in the exemplary embodiment, the third floating contact assembly 64 is coupled to, and in electrical communication with, a line.

The contact insulator 34 is a hollow body 50, as noted above. The floating contact assemblies 60, 62, 64 are disposed about the inner surface of the contact insulator body 50. Thus, the floating contact assemblies 60, 62, 64, in the exemplary embodiment, have a generally circular cross-section. More specifically, the elements of the contact insulator floating contact assemblies 60, 62, 64 are generally toroidal in shape. The following shall describe a single contact assembly 36; it is understood that each of the contact insulator floating contact assemblies 60, 62, 64 are substantially similar.

Figure 3:
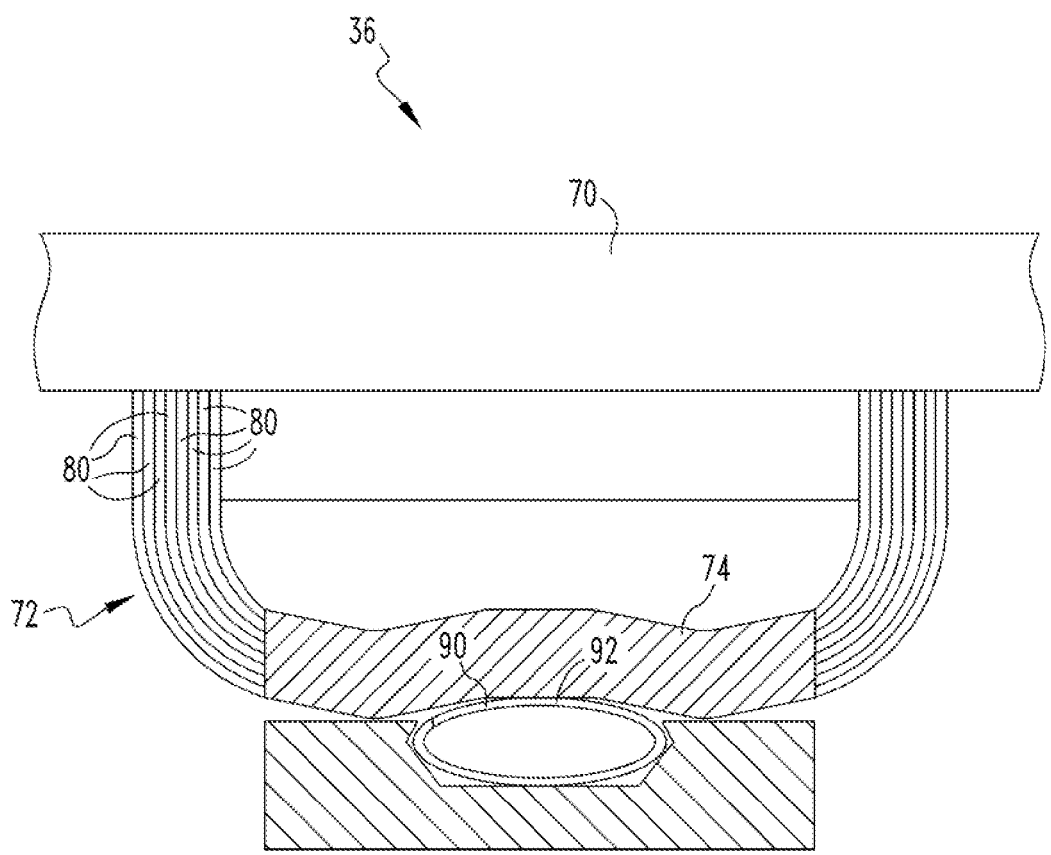
FIG. 3 is a schematic cross-sectional view of a floating contact assembly.

A floating contact assembly 36, as shown in FIG. 3, includes a first conductive member 70, a flexible conductive shunt 72, and a second conductive member 74. The first conductive member 70 and the second conductive member 74 are, in an exemplary embodiment, substantially rigid. The flexible conductive shunt 72 is coupled to, and in electrical communication with, the first conductive member 70. The second conductive member 74 is coupled to, and in electrical communication with, the flexible conductive shunt 72. Thus, the second conductive member 74 is floatably coupled to the first conductive member 70. As noted above, in an exemplary embodiment, the elements of a contact assembly 36 are generally toroidal. Thus, the first conductive member 70 has generally circular a cross-sectional area (when viewed along the axis of contact assembly 36) that is larger than the generally circular cross-sectional area of the second conductive member 74. In an exemplary embodiment, the first conductive member 70 has an inner surface radius of between about 3.0 and 2.8 inches, and more preferably about 2.9 inches, and, the second conductive member 74 has an inner surface radius of between about 2.6 and 2.4 inches, and more preferably about 2.5 inches. In an exemplary embodiment, the first conductive member 70 is coupled to, directly coupled, or fixed to the inner surface of the contact insulator 34. The first conductive member 70 is further coupled to, and in electrical communication with, one bus 40, 42, 42. The conductive shunt 72 includes a number of layers of conductive foil 80. Further, the conductive shunt 72 is semi-rigid and structured to bias the second conductive member 74 away from the first conductive member 70. The second conductive member 74 may include a recess or seat sized to accommodate non-floating contact 90 (discussed below), i.e. first and second switching element contacts 27, 29.

Accordingly, the switchgear 10 may be placed in various positions as follows. It is noted that the switching element 18 may be configured with the internal contacts 21 in the open position during any movement of the circuit breaker assembly 14. The following will describe the switching element 18 moving into the contact insulator 34. As this occurs, the first and second switching element contacts 27, 29 are moved into, and out of, contact with the contact insulator floating contact assembly 60, 62, 64. It is understood that when a switching element contact 27, 29 engages, i.e. is brought into contact with, a contact insulator floating contact assembly 60, 62, 64, the elements are placed in electrical communication with each other. Further, it is understood that, while the longitudinal axes of the switching element 18 and the contact insulator 34, are generally aligned, any misalignment of the first and second switching element contacts 27, 29 and a contact insulator floating contact assembly 60, 62, 64 is addressed by the floating second conductive member 74 of each floating contact assembly 60, 62, 64. That is, if there is a misalignment, the floating second conductive member 74 of each contact insulator floating contact assembly 60, 62, 64 will move into a proper alignment when a first or second switching element contact 27, 29 engages the contact insulator contact assembly 60, 62, 64. The movement of the second conductive member 74 is caused by the physical interaction of the first or second switching element contact 27, 29 engaging the second conductive member 74 and the second conductive member 74 moving relative to the first conductive member 70 via the flexing of the conductive shunt 72.

The circuit breaker assembly 14 may be in the first position initially. That is, the switching element 18 is disposed outside of the contact insulator 34. As the circuit breaker assembly 14 moves toward the second position, the switching element second contact 29, which is disposed at the switching element distal, second end 24, is moved into contact with the contact insulator first floating contact assembly 60. Thus, in this intermediate position, and in the exemplary embodiment, the switching element 18 is in electrical communication with the ground via the contact insulator first floating contact assembly 60 and the first bus 40.

As the circuit breaker assembly 14 continues to move toward the second position, the switching element second contact 29 disengages from the contact insulator first floating contact assembly 60. Further motion toward the circuit breaker assembly 14 second position causes the switching element second contact 29 to engage the contact insulator second floating contact assembly 62 while the switching element first contact 27 engages the contact insulator first floating contact assembly 60. In this intermediate position, and in the exemplary embodiment, the load is grounded via the switching element 18. That is, the load is coupled to, and in electrical communication with the switching element 18 via the second bus 42 and contact insulator second floating contact assembly 62 while the switching element 18 is grounded via the contact insulator first floating contact assembly 60 and the first bus 40.

As the circuit breaker assembly 14 continues to move toward the second position, the switching element second contact 29 disengages from the contact insulator second floating contact assembly 62 and the switching element first contact 27 disengages from the contact insulator first floating contact assembly 60. Moving the circuit breaker assembly 14 to the second position causes the switching element second contact 29 to engage the contact insulator third floating contact assembly 64 while the switching element first contact 27 engages the contact insulator second floating contact assembly 62. In the second position, and in the exemplary embodiment, the line is coupled to the load via the switching element 18. That is, the line is coupled to, and in electrical communication with the switching element 18 via the third bus 44 and contact insulator third floating contact assembly 64, while the switching element 18 is coupled to the load via the contact insulator second floating contact assembly 62 and the second bus 42.

Thus, a floating contact assembly 36 may be in one of two configurations; a first configuration, wherein the floating contact assembly 36 is not coupled to and in electrical communication with a switching element contact 27, 29, and a second configuration, wherein the floating contact assembly 36 is coupled to and in electrical communication with a switching element contact 27, 29.

In the embodiment described above, each floating contact assembly 36 was described as being coupled to the contact insulator 34. It is understood, however, that this invention may be practiced with the contact assembly 36 disposed on the switching element 18. That is, the first conductive member 70 may be coupled to, directly coupled to, or fixed to the outer surface of the switching element 18. In this embodiment, the second conductive member 74 has a larger cross-sectional area than the first conductive member 70. Further a non-floating contact 90, i.e. a contact including a conductive body 92 but not including a flexible shunt 72, may be disposed on the inner surface of the contact insulator 34. Accordingly, the floating contact assembly 36 may be coupled to one of the housing assembly 12 or the switching element 18; while a non-floating contact 90 is coupled to the other of the housing assembly 12 or the switching element 18.

While specific embodiments of the invention have been described in detail, it will be appreciated by those skilled in the art that various modifications and alternatives to those details could be developed in light of the overall teachings of the disclosure. For example, a floating contact 36 may be disposed on both switching element 18 and the contact insulator body 50. That is, the disclosed concept includes any configuration wherein a floating contact 36 engages a conductive body 92. Thus, the conductive body 92 may be disposed on either the switching element 18 or the contact insulator 34 while the floating contact 36 is disposed on the other. Accordingly, the particular arrangements disclosed are meant to be illustrative only and not limiting as to the scope of invention which is to be given the full breadth of the claims appended and any and all equivalents thereof.

What is claimed is:

1. A floating contact assembly for a switchgear assembly, said switchgear assembly including a housing assembly and a circuit breaker assembly including an elongated switching element, said circuit breaker assembly moving between a first withdrawn position and a second inserted position, one of said housing assembly or said switching element including a non-floating contact, said floating contact assembly comprising:
   a first conductive member;
   a flexible conductive shunt;
   a second conductive member;
   said first conductive member coupled to one of said housing assembly or said switching element;
   said flexible conductive shunt coupled to, and in electrical communication with, said first conductive member;
   said second conductive member coupled to, and in electrical communication with, said flexible conductive shunt;
   wherein said second conductive member is floatably coupled to said first conductive member; and
   wherein said second conductive member has a cross-sectional shape corresponding to the cross-sectional shape of said non-floating contact.

2. A floating contact assembly for a switchgear assembly, said switchgear assembly including a housing assembly and a circuit breaker assembly including an elongated switching element, said circuit breaker assembly moving between a first withdrawn position and a second inserted position, one of said housing assembly or said switching element including a non-floating contact, said floating contact assembly comprising:
   a first conductive member;
   a flexible conductive shunt;
   a second conductive member;
   said first conductive member coupled to one of said housing assembly or said switching element;
   said flexible conductive shunt coupled to, and in electrical communication with, said first conductive member;
   said second conductive member coupled to, and in electrical communication with, said flexible conductive shunt;
   wherein said second conductive member is floatably coupled to said first conductive member; and
   wherein said non-floating contact is a generally circular torus and wherein said second conductive member is a generally circular torus.

3. A switchgear assembly comprising:
   a housing assembly including a number of hollow contact insulators;
   each said contact insulator including a number of floating contact assemblies disposed on the inner surface thereof;
   a circuit breaker assembly including a number of switching elements, each said switching element including an elongated body with a number of non-floating contacts disposed about each said body;
   each floating contact assembly including a first conductive member, a flexible conductive shunt, and a second conductive member;
   said first conductive member coupled to contact insulator;
   said flexible conductive shunt coupled to, and in electrical communication with, said first conductive member;
   said second conductive member coupled to, and in electrical communication with, said flexible conductive shunt;
   wherein said second conductive member is floatably coupled to said first conductive member; and
   wherein said circuit breaker assembly is structured to move between a first, non-engaged position, wherein each said floating contact assembly is not in electrical communication with a non-floating contact assembly, and a second, engaged position, wherein each said floating contact assembly is in electrical communication with a non-floating contact.

4. The switchgear assembly of claim 3 wherein said second conductive member has a cross-sectional shape corresponding to the cross-sectional shape of said non-floating contact.

5. The switchgear assembly of claim 3 wherein:
   each said contact insulator is an elongated body including a proximal end, a medial portion, and a distal end;
   wherein a first floating contact assembly is disposed at said contact insulator proximal end, a second floating contact assembly is disposed at said contact insulator medial portion, and a third floating contact assembly is disposed at said contact insulator distal end;
   each said switching element including a proximal end and a distal end; and
   wherein a non-floating contact is disposed at each said switching element proximal end and each said switching element distal end.

6. The switchgear assembly of claim 3 wherein said flexible conductive shunt includes a number of layers of conductive foil.

7. The switchgear assembly of claim 6 wherein:
   said flexible conductive shunt is semi-rigid; and
   said second conductive member is biased away from said first conductive member.

8. The switchgear assembly of claim 3 wherein said non-floating contact is a generally circular torus and wherein said second conductive member is a generally circular torus.

9. The switchgear assembly of claim 8 wherein said non-floating contact has a body, wherein said non-floating contact is a coil.

* * * * *